United States Patent
Kurts et al.

(10) Patent No.: US 9,870,301 B2
(45) Date of Patent: Jan. 16, 2018

(54) HIGH-SPEED DEBUG PORT USING STANDARD PLATFORM CONNECTIVITY

(71) Applicant: Intel Corporation, Santa Clara, CA (US)

(72) Inventors: Tsvika Kurts, Haifa (IL); Eilon Hazan, Hogla (IL); Sean T. Baartmans, Portland, OR (US); Marcus R. Winston, Aloha, OR (US); Rony Ghattas, Hillsboro, OR (US); Arie Bernstein, Kfar Saba (IL); Todd M. Witter, Orangevale, CA (US); Marcelo Yuffe, Binyamina (IL)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 14/231,240

(22) Filed: Mar. 31, 2014

(65) Prior Publication Data

US 2015/0278058 A1  Oct. 1, 2015

(51) Int. Cl.
*G06F 11/00* (2006.01)
*G06F 11/34* (2006.01)
*G06F 11/30* (2006.01)
*G06F 11/32* (2006.01)
*G06F 11/36* (2006.01)

(52) U.S. Cl.
CPC ...... *G06F 11/3476* (2013.01); *G06F 11/3024* (2013.01); *G06F 11/323* (2013.01); *G06F 11/3409* (2013.01); *G06F 11/3636* (2013.01); *G06F 11/3656* (2013.01); *G06F 11/3466* (2013.01)

(58) Field of Classification Search
CPC ............ G06F 11/2236; G06F 11/3656; G06F 11/3648; G06F 11/3476; G06F 11/3024; G06F 11/323; G06F 11/3409; G06F 11/3636; G06F 11/3466; H05K 999/99; G01R 31/318555
USPC .......................................................... 714/30
See application file for complete search history.

(56) References Cited

U.S. PATENT DOCUMENTS

| 6,041,406 A * | 3/2000 | Mann .................... G06F 11/348 712/227 |
| 8,826,081 B2 * | 9/2014 | Hopkins ............. G06F 11/3636 714/27 |
| 2010/0318848 A1 * | 12/2010 | Yang ................... G06F 11/3656 714/30 |

(Continued)

*Primary Examiner* — Matt Kim
*Assistant Examiner* — Katherine Lin
(74) *Attorney, Agent, or Firm* — Lowenstein Sandler LLP

(57) ABSTRACT

A processing device comprises a debug port controller to monitor operations of the processing device to determine whether the processing device is operating in a first mode or a second mode and to collect trace information comprising operating characteristics of the processing device. The processing device further comprises a display engine logic to process display data for output to a display device. In addition, the processing device comprises a display engine interface to provide, to a plurality of existing platform connectors, the display data from the display engine logic when the processing device is operating in the first primary mode and the trace information from the debug port controller when the processing device is operating in the second mode as determined by the debug port controller.

20 Claims, 10 Drawing Sheets

(56) References Cited

U.S. PATENT DOCUMENTS

| | | | | |
|---|---|---|---|---|
| 2012/0110353 A1* | 5/2012 | Ehrlich | ............... | G06F 1/3203 713/300 |
| 2013/0007537 A1* | 1/2013 | Kanematsu | ......... | G06F 11/3055 714/49 |
| 2013/0048372 A1* | 2/2013 | Overby | ............... | G09G 3/006 174/70 R |

* cited by examiner

Debug Status Register 352

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0x0 | 0x0 | 0x0 | 0x0 | 0x0 | 0x0 | 0x0 | 0x0 | 0x0 | 0x0 | 0x0 | 0x0 | 0x0 | 0x0 | 0x0 | 0x0 |

Fig. 4A

| Bit | Description |
|---|---|
| 0 | HDPORT_EN |
| 1 | DDI0_used |
| 2 | HDMI_DP0 |
| 3 | DDI1_used |
| 4 | HDMI_DP1 |
| 5 | DDI2_used |
| 6 | HDMI1_DP2 |
| 7 | DDI3_used |
| 8 | HDMI_DP2 |
| 9 | RSRV |
| 10 | RSRV |
| 11 | RSRV |
| 12 | DPLL0_used |
| 13 | DPLL1_used |
| 14 | DPLL2_used |
| 15 | DPLL3_used |

Fig. 4B

HIGH-SPEED DEBUG PORT USING STANDARD PLATFORM CONNECTIVITY

TECHNICAL FIELD

This disclosure relates to the field of digital processing devices and, in particular, to a high-speed debug port using standard platform connectors.

BACKGROUND

Debugging is a methodical process of finding and reducing the number of defects (i.e., "bugs") in a piece of electronic equipment or a computer program running thereon. Various debug techniques can be used to detect anomalies, assess their impact, and schedule hardware changes, software patches or full updates to a system. The goals of debugging include identifying and fixing bugs in the system (e.g., logical or synchronization problems in the code, or a design error in the hardware) and collecting information about the operation of the system that may then be used to analyze the system to find ways to boost its performance or to optimize other important characteristics.

BRIEF DESCRIPTION OF THE DRAWINGS

The present disclosure is illustrated by way of example, and not by way of limitation, in the figures of the accompanying drawings.

FIG. 4A is a diagram illustrating a debug status register in a debug port controller, according to an embodiment.

FIG. 4B is a diagram illustrating a table defining the bits of a debug status register, according to an embodiment.

DETAILED DESCRIPTION

Figure 1:
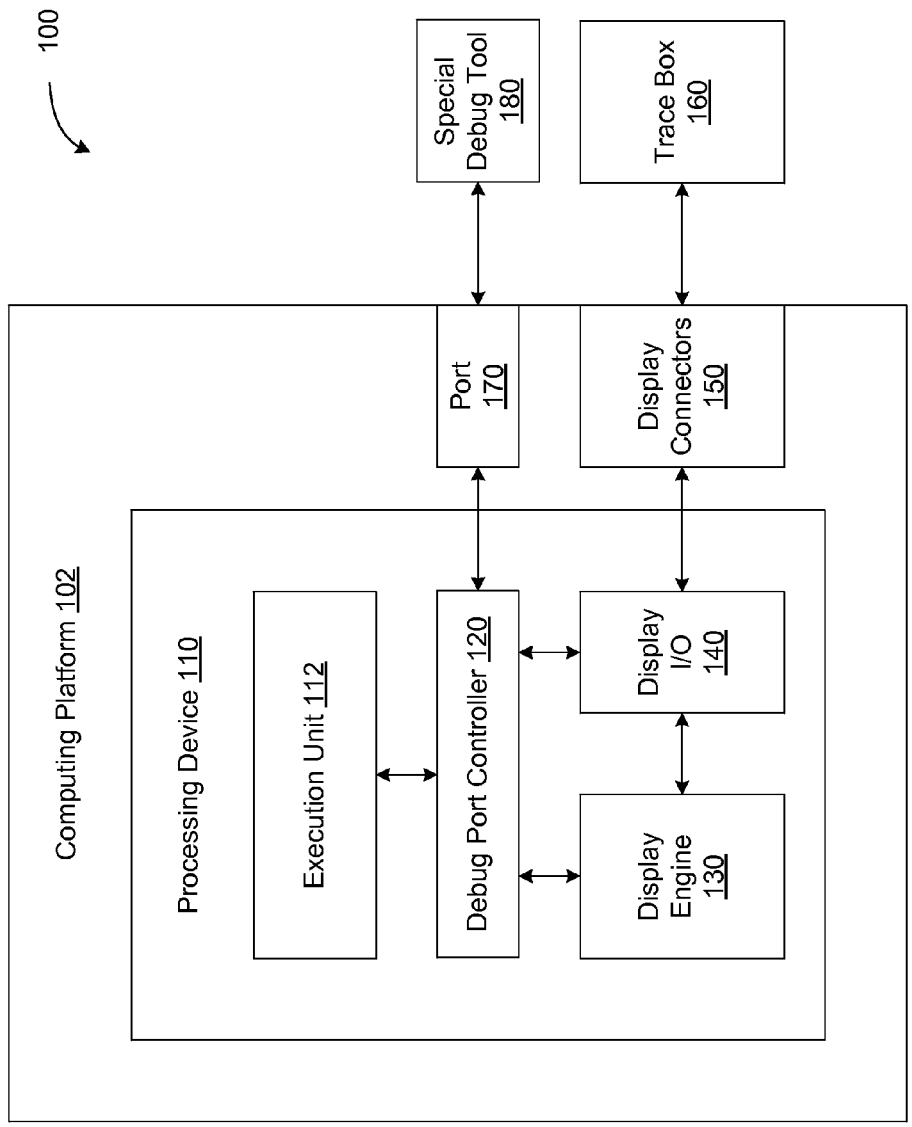
FIG. 1 is a block diagram illustrating a computing platform with an existing high-speed port connector that is also used for transporting debug and performance data, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Described herein is a method and system for processor debugging using existing high-speed port connectors. Conventional microprocessors generally do not have a closed chassis debug capability (i.e., the ability to perform a debugging operation without physically opening the computing platform chassis to access the processor). The ability to debug without opening the system, however, has become a strong time-to-market demand from original equipment manufacturers (OEMs), and the silicon companies that support the OEMs, since they spend large amounts of effort and time trying to probe processor signals in very condensed system (e.g., a tablet or ultrabook). In previous digital system designs, including processor architectures, a dedicated processor port was used to access debug information in an open chassis debug operation. In an effort to reduce die size, future processor architectures may no longer include the dedicated port, which will also save cost and power. This may result however, in a decrease in debug capability.

In order to enable a closed chassis debug, save time-to-market in the processor development stage, and provide realistic power management analysis, in one embodiment, a processing device outputs internal trace information through existing platform connectors, such as a High-Definition Multimedia Interface (HDMI) or Display Port (DP) connectors. The trace information or "trace data" can include, debug, performance, and/or other information about operation of the system. In one embodiment, any kind of data related to system performance or operation can be sent across this link and will fit within an intended use of the existing high-speed port to get data off the chip (or out of the system) without opening the chassis. This is a unique method for running a debug protocol (e.g., Aurora) on top of the existing HDMI electrical infrastructure. The debug techniques described herein support debug operations at extreme conditions where other conventional debug hooks fail to deliver, such as during a reset sequence, at a low power state, etc. In addition, this is a non-intrusive solution that provides debug capabilities on all processor dies, including those without a dedicated debug port. In other embodiments, other high-speed ports that are accessible in a closed-chassis system, such as eSATA, Ethernet, USB, and other ports, all are potential candidates for conveying trace information as described herein. The remainder of this document will refer to an embodiment using display ports (e.g., HDMI or DP), however, it should be understood that similar principles may apply when using other ports.

In one embodiment, the debug solution described herein makes intelligent reuse of HDMI/DP interfaces, but not the Display Engine logic. The platform display connectors can function normally (i.e., to provide display data) in one mode of operation, but in case of a system anomaly, can be configured to provide trace information in a second mode. For example, the user may unplug the regular display cable from the platform display connector and connects instead a trace box or other collection or storage device. This allows for the export of trace information and storage in the trace box memory for later extraction to a remote host for post processing and analysis.

FIG. 1 is a block diagram illustrating a computing platform with an existing high-speed port connector that is also used for transporting debug and performance data, according to an embodiment. In one embodiment, the computing environment 100 includes a computing platform 102 with a processing device 110. Computing platform 102 may be a personal computer (PC) either laptop or desktop, a subnotebook or ultraportable PC, a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing platform is illustrated, the term "computing platform" or "computing device" shall also be taken to include any collection of machines that individually or jointly execute a set (or multiple sets) of instructions to perform any one or more of the methodologies discussed herein.

Processing device 110 may be, for example, a multi-core processor including multiple cores. These cores may be physical processors, and may include various components such as front end units, execution units and back end units. Processing device 110 may represent one or more general-purpose processing devices such as a microprocessor, central processing unit, or the like. Processing device 110 may implement a complex instruction set computing (CISC) architecture, a reduced instruction set computer (RISC) architecture, a very long instruction word (VLIW) architecture, or other instruction sets, or a combination of instruction sets, through translation of binary codes in the above mentioned instruction sets by a compiler.

Processing device 110 may employ execution units including logic to perform algorithms for process data, such as in the embodiments described herein. Processing device 110 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, computing platform 102 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

In this illustrated embodiment, processing device 110 includes one or more execution units 112 to implement an algorithm that is to perform at least one instruction. One embodiment may be described in the context of a single processor desktop or server system, but alternative embodiments may be included in a multiprocessor system. The processing device 110 may be coupled to a processor bus that transmits data signals between the processing device 110 and other components in the platform 102, such as a memory, etc.

Execution unit 112, including logic to perform integer and floating point operations, also resides in the processing device 110. The processing device 110, in one embodiment, includes a microcode (µcode) ROM to store microcode, which when executed, is to perform algorithms for certain macroinstructions or handle complex scenarios. Here, microcode is potentially updateable to handle logic bugs/fixes for processing device 110.

In one embodiment, processing device 110 includes debug port controller 120, display engine 130, and display engine interface 140. Debug port controller 120 may be designed to perform operations related to debugging processing device 110. As used herein, the term debugging refers to a process of finding and reducing the number of defects (i.e., "bugs") in processing device 110 or in a computer program running on processing device 110. The debugging process aims to identify and potentially remedy bugs in the operation of processing device 110 and includes collecting information about the operating states of processing device 110 that may be used to analyze processing device 110 to find ways to boost its performance or to optimize other operational characteristics. In one embodiment, debug port controller 120 monitors operations of processing device 110 and collects trace information from processing device 110. In one embodiment, debug port controller 120 determines, based on the monitoring of operations, whether processing device 110 is operating in a first, primary, operation mode or in a second, debug, operation mode. In one embodiment, debug port controller 120 includes a debug status register storing a value indicating the mode of operation. In one embodiment, the value in the debug status register is received from an external special debug tool 180 connected to computing platform 102 through communications port 170 (e.g., a universal serial bus (USB) port) or other connector. Depending on the mode of operation, debug port controller 120 may cause display engine interface 140 to output either display data from display engine 130 or trace information through existing display connectors 150 on computing platform 102. In one embodiment, the debug status register in debug port controller 120 is mirrored to a read-only copy of the register in display engine 130. Each time a change is made to the register in debug port controller 120, the copy in display engine 130 may be updated as well. This allows a coexistence between the display engine 130 and the debug port controller 120 and allows display engine 130 to output display data to the DDI(s) that is not being used by debug port controller 120.

In one embodiment, display connectors 150 are existing connectors on computing platform 102. In conventional systems, display connectors 150 may be used only to output display information from computing platform to an attached display device. In one embodiment, debug port controller 120 repurposes display connectors 150 as a means to export trace information pertaining to processing device 110. In one embodiment, a trace box 160 is connected to computing platform 102 through display connectors 150. Trace box 160 may be any type of computing device or storage device that can temporarily (or permanently) store the trace information received through display connectors 150. In one embodiment, analysis of the trace information may be performed by trace box 160. In another embodiment, the trace information is later transferred from trace box 160 to another computing system for analysis of the trace information. Trace box 160 can capture hardware and software trace information and can also perform protocol conversion. For example, trace box 160 can capture data in the Aurora protocol or in a display protocol and perform encoding for data storage for transfer to a remote host. In one embodiment, display connectors 150 may include digital display interface (DDI) connectors, such as high-definition multimedia interface (HDMI) connectors, display port (DP) connectors, or a combination of these and/or other connectors.

Figure 2:
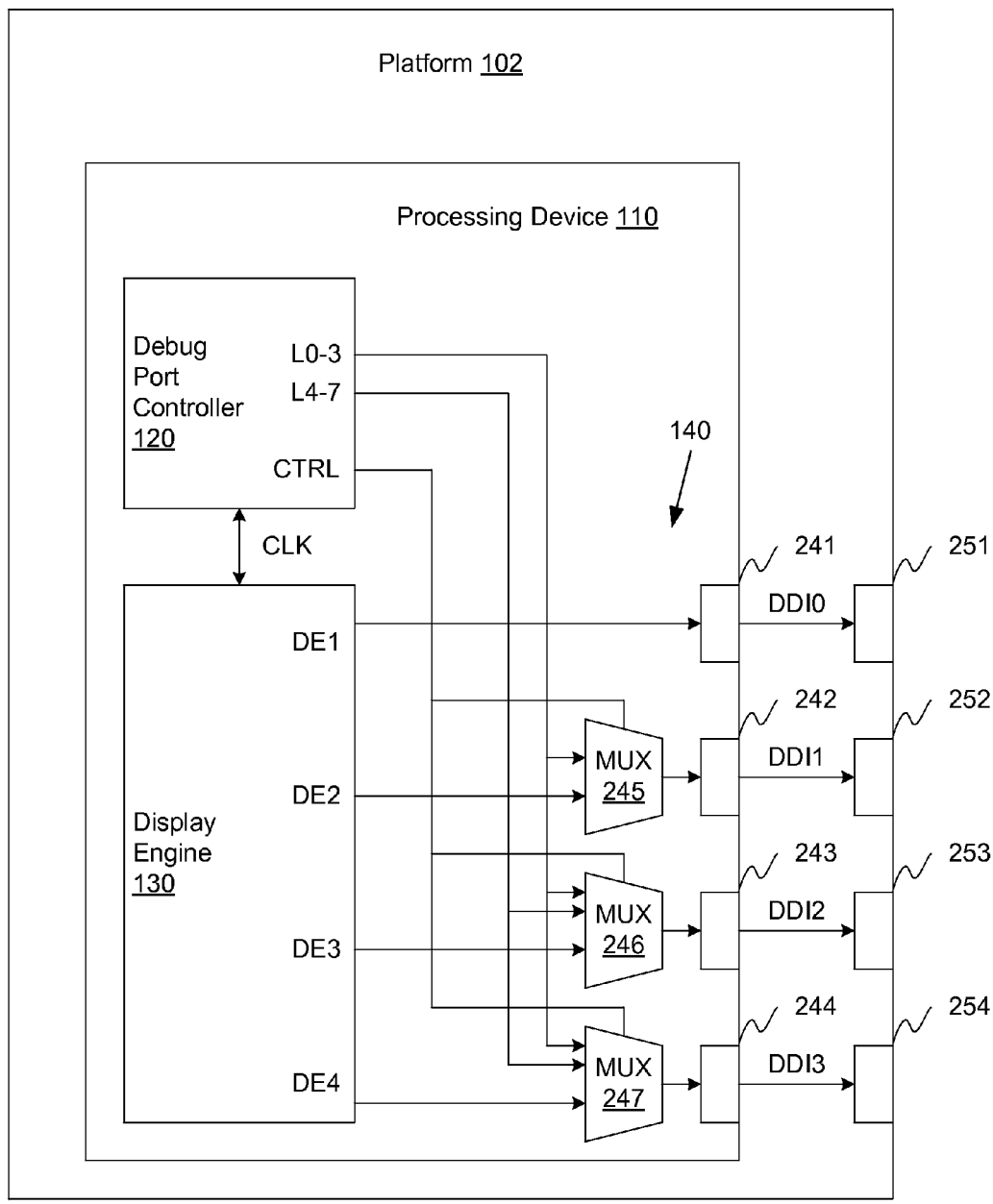
FIG. 2 is a block diagram illustrating additional details of a computing platform with a processing device and an existing high-speed port connector used to export trace data, according to an embodiment.

FIG. 2 is a block diagram illustrating additional details of a computing platform with a processing device and an existing high-speed port connector used to export trace data, according to an embodiment. As described above, computing platform 102 includes processing device 110 and multiple display connectors 251-254. In one embodiment, processing device 110 includes debug port controller 120, display engine 130 and display interface 140. In one embodiment, display interface 140 includes physical layer (PHY) interface ports 241-244. Each of PHY ports 241-244 may correspond to a different one of display connectors 251-254 on platform 102. In one embodiment, display interface 140 further includes multiplexers 245, 246 and 247. In one embodiment, multiplexer 245 falls in the signal path of PHY port 242 and display connector 252, multiplexer 246 falls in the signal path of PHY port 243 and display connector 253, and multiplexer 247 falls in the signal path of PHY port 244 and display connector 254. In one embodiment, PHY port 241 and display connector 251 do not include a multiplexer in the signal path as they may be reserved for display data output, regardless of the mode of operation. In one embodiment, PHY port 241 is reserved as an embedded display port (eDP). In one embodiment, multiplexers 245, 246 and 247 are controlled by a control signal (CTRL) received from debug port controller 120. In one embodiment, a phase locked-loop (PLL) in display engine 130 generates a clock signal for the functional logic. This clock signal CLK may be provided to debug port controller 120 to control the logic there as well.

In one embodiment, each of multiplexers 245, 246 and 247 receives display data from display engine 130 and trace information from debug port controller 120 as inputs. In one embodiment, display engine 130 processes display data for output to a display device and includes output DE1, DE2, DE3 and DE4. In one embodiment, output DE1 is applied directly to PHY port 241, output DE2 is applied to multiplexer 245, output DE3 is applied to multiplexer 246 and output DE4 is applied to multiplexer 347. In one embodiment, debug port controller 120 includes two output buses each to carry four lanes of trace information. The first four lanes L0-3 may be applied to each of multiplexers 245, 246 and 247, while the second four lanes L4-7 may be applied to multiplexers 246 and 247. The bandwidth allowed by any one of display connectors 252, 253, 254 may be insufficient to transfer trace information from all eight output lanes L0-7 of debug port controller 120 at once. Thus, in one embodiment, two display connectors may be used as once to transfer trace information to trace box 160 (e.g., display connector 252 and one of either display connector 253 or 254). The number of digital display interfaces and corresponding multiplexers used can vary depending on the embodiment and/or on bandwidth requirements of the system. For example, certain platforms may include two, three, or more multiplexers.

In one embodiment, debug port controller 120 determines whether the processing device 110 is operation in a first, primary, operational mode or a second, debug, operational mode by accessing a debug status register storing a value to indicate the mode of operation. If the value in the debug status register indicates the primary mode, debug port controller 120 may provide a control signal CTRL to multiplexers 245, 246 and 247 to cause them to pass the display data from outputs DE2, DE3 and DE4 of display engine 130 to PHY ports 242, 243, 244 and existing platform display connectors 252, 253, 254. If the value in the debug status register indicates the debug mode, debug port controller 120 may provide a control signal CTRL to multiplexers 245, 246 and 247 to cause them to pass the trace information from outputs L0-3 and L4-7 of debug port controller 120 to PHY ports 242, 243, 244 and existing platform display connectors 252, 253, 254.

Figure 3:
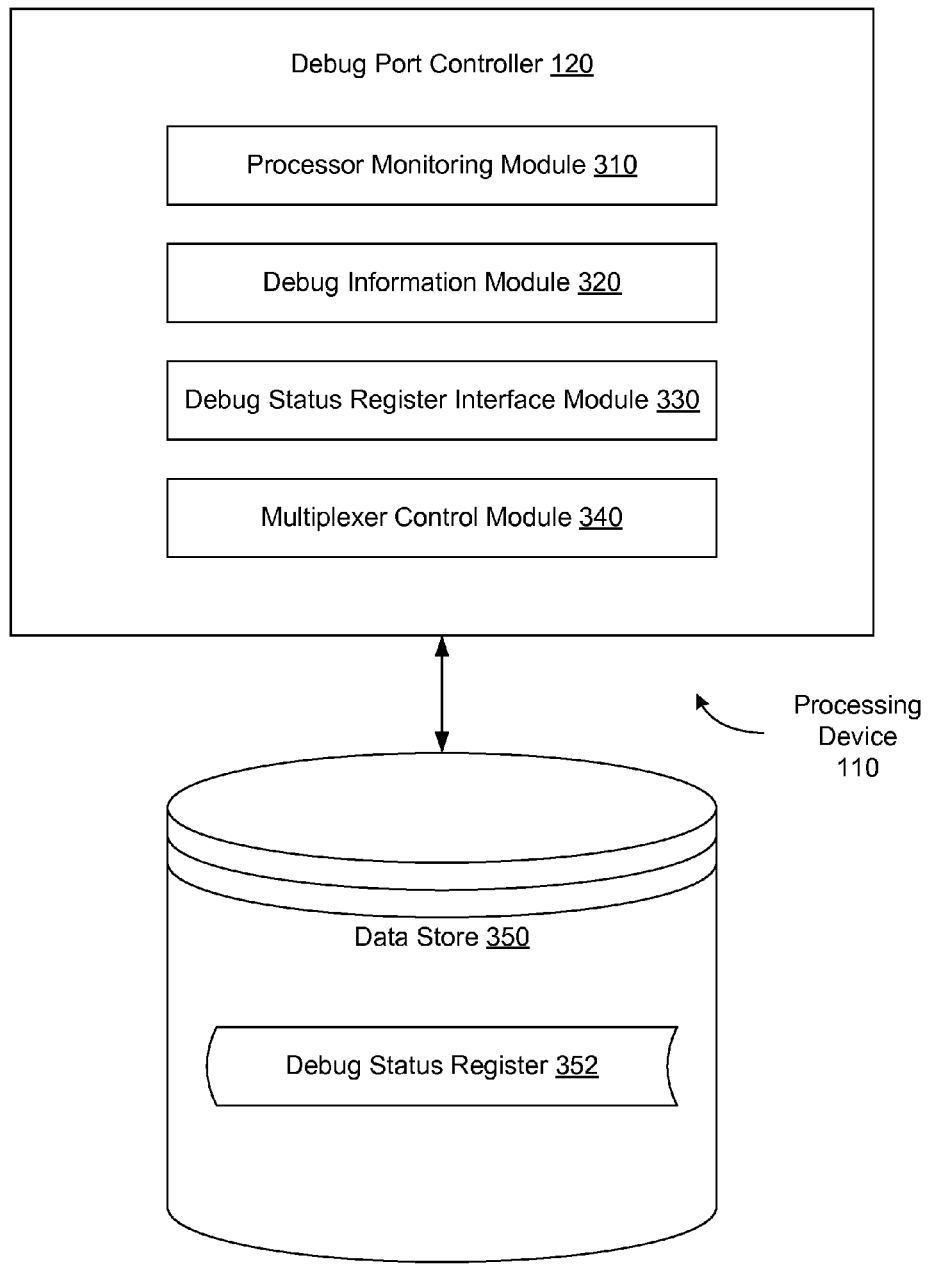
FIG. 3 is a block diagram illustrating a debug port controller in a processing device, according to an embodiment.

FIG. 3 is a block diagram illustrating a debug port controller in a processing device, according to an embodiment. In one embodiment, debug port controller 120 includes processor monitoring module 310, debug information module 320, debug status register interface module 330 and multiplexer control module 340. This arrangement of modules and components may be a logical separation, and in other embodiments, these modules or other components can be combined together or separated in further components, according to a particular embodiment. In one embodiment, data store 350 is connected to debug port controller 120 and includes debug status register 352. In one embodiment, processing device 110 may include both debug port controller 120 and data store 350. In another embodiment, data store 350 may be external to processing device 110 and may be connected to debug port controller 120 over a network or other connection. In other embodiments, processing device 110 may include different and/or additional components which are not shown to simplify the description. Data store 350 may include a main memory, such as read-only memory (ROM), flash memory, dynamic random access memory (DRAM) (such as synchronous DRAM (SDRAM) or Rambus DRAM (RDRAM), etc.), or a static memory, such as flash memory, static random access memory (SRAM), etc. In other embodiments, data store 350 may include some other type of storage device for storing information in a form (e.g., software, processing application) readable by a machine (e.g., a computer). The data store 350 may include a machine-readable medium including, but not limited to, magnetic storage medium (e.g., floppy diskette), optical storage medium (e.g., CD-ROM), magneto-optical storage medium, erasable programmable memory (e.g., EPROM and EEPROM), flash memory; or another type of medium suitable for storing electronic instructions.

In one embodiment, processor monitoring module 310 monitors the operations of processing device 110. Processor monitoring module 310 may observe and log actions performed by execution unit 112, display engine 130, display interface 140 and other components of processing device 110. In one embodiment, this monitoring includes tracking the values stored in various processor registers, including for example, debug status register 352. This data may be gathered during the various operating stages of processing device 110, such as during boot-time, during normal operation, or during shut-down.

In one embodiment, debug information module 320 generates trace information that can be used during a debugging process. For example, debug information module 320 may collect, arrange, organize or summarize the data gathered by processor monitoring module 310. Debug information module 320 may create a series of reports to be output to trace box 160 over display connectors 150 that identify anomalies, discrepancies, defects or errors that occur in processing device 110. In another embodiment, debug information module 320 may provide just the raw data from processor monitoring module 310 for analysis by another external computing system. In one embodiment, the trace information comprises at least one of power consumption data, protection ring data, memory access data, processing device interconnect data, or other data. The power consumption data can include, for example, Pcode power commands, voltage regulator responses, thermal information, package and core C state residency, etc. The protection ring data can include, for example, ring transactions, core and thread identifiers, graphics transactions, cache attributes, secure enclave range transactions, etc. The memory access data can include memory reads/writes at a signal level which can replace a logic analyzer, such as RAS, CAS, CMD, etc. The processing device interconnect data can include data sent over an on die package interconnect which replaces the direct media interface (DMI). Other trace information can include, for example, architectural event trace data, such as WRMSR, RDMSR, core power events, interrupts, etc., real time instruction trace data, or other data.

In one embodiment, debug status register interface module 330 manages debug status register 352. Debug status register interface module 330 may receive a debug status value to be stored in debug status register 352 from special debug tool 180 connected to computing platform 102 through communications port 170. Upon receiving a debug status value, debug status register interface module 330 may write the debug status value into debug status register 352. Either periodically or in response to a request for trace information, debug status register interface module 330 may access debug status register 352 to determine the mode of operation of processing device 110 (i.e., primary mode or debug mode). Based on the value stored in debug status register 352, debug status register interface module 330 may determine the operational mode and provide an indication of such mode to multiplexer control module 340. Additional details regarding debug status register 352 are provided below with respect to FIGS. 4A-4B.

In one embodiment, multiplexer control module 340 generates a control signal CTRL to be applied to multiplexers 245, 246 and 247. If debug status register interface module 330 determines that the processing device is in a primary mode of operation, the control signal CTRL may cause multiplexers 245, 246 and 247 to pass the display data from outputs DE2, DE3 and DE4 of display engine 130. If debug status register interface module 330 determines that the processing device is in a debug mode of operation, the control signal CTRL may cause multiplexers 245, 246 and 247 to pass the trace information from outputs L0-3 and L4-7 of debug port controller 120.

FIG. 4A is a diagram illustrating a debug status register in a debug port controller, according to an embodiment. In one embodiment, debug status register 352 can be used to store a debug status value received from special debug tool 180 through communications port 170. In one embodiment, debug status register 352 includes a horizontal row of 16 bits which is overwritten each time a new debug status value is received. Each bit in the debug status value represents a different element of the mode of operation of processing device 110. Descriptions of each bit are provided below with respect to FIG. 4B. In other embodiments, debug status register 352 may be arranged in some other fashion. In other embodiments, debug status register 352 may be some other form of data structure.

FIG. 4B is a diagram illustrating a table defining the bits of a debug status register, according to an embodiment. In one embodiment, bit 0 is labeled HDPORT_EN. If bit 0 is set (e.g., logic 1), this indicates that the processing device is in the second, debug, mode of operation and trace information is to be output through existing display connectors 150. If bit 0 is not set (e.g., logic 0), this indicates that the processing devices is in the first, primary, mode of operation and display data is to be output through existing display connectors 150.

In one embodiment, bit 1 is labeled DDI0_used. If bit 1 is set, this indicates that digital display interface 0 (DDI0— i.e., PHY port 241 and display connector 251) is being used to output trace information. In one embodiment, however, bit 1 is constantly not set (e.g., logic 0) since digital display interface 0 (DDI0—i.e., PHY port 241 and display connector 251) is reserved for use by output DE1 of display engine 130.

In one embodiment, bit 2 is labeled HDMI_DP0. If bit 2 is set, this indicates that DDI0 is being used in HDMI mode. If bit 2 is not set, this indicates that DDI0 is being used in DP mode. In one embodiment, however, bit 2 is constantly not set since DDI0 is reserved for use by output DE1 of display engine 130.

In one embodiment, bit 3 is labeled DDI1_used. If bit 3 is set, this indicates that digital display interface 1 (DDI1— i.e., PHY port 242 and display connector 252) is being used to output trace information and thus, should not be used by output DE2 of display engine 130. Accordingly, the control signal CTRL applied to multiplexer 245 should pass lanes L0-3 or L4-7 from debug port controller 120.

In one embodiment, bit 4 is labeled HDMI_DP1. If bit 4 is set, this indicates that DDI1 is being used in HDMI mode. If bit 4 is not set, this indicates that DDI1 is being used in DP mode. HDMI mode and DP mode are selected depending on whether the corresponding connector 252 is an HDMI connector or a DP connector. Depending on the mode, the debug data may be packed differently to accommodate the protocols used and the speed of the connector (e.g., 2.97 GHz for HDMI or 5.4 GHz for DP).

In one embodiment, bit 5 is labeled DDI2_used. If bit 5 is set, this indicates that digital display interface 2 (DDI2— i.e., PHY port 243 and display connector 253) is being used to output trace information and thus, should not be used by output DE3 of display engine 130. Accordingly, the control signal CTRL applied to multiplexer 246 should pass lanes L0-3 or L4-7 from debug port controller 120.

In one embodiment, bit 6 is labeled HDMI_DP2. If bit 6 is set, this indicates that DDI2 is being used in HDMI mode. If bit 6 is not set, this indicates that DDI2 is being used in DP mode.

In one embodiment, bit 7 is labeled DDI3_used. If bit 7 is set, this indicates that digital display interface 3 is being used to output trace information and thus, should not be used by output DE4 of display engine 130. Accordingly, the control signal CTRL applied to multiplexer 247 should pass lanes L0-3 or L4-7 from debug port controller 120.

In one embodiment, bit 8 is labeled HDMI_DP3. If bit 8 is set, this indicates that DDI3 is being used in HDMI mode. If bit 8 is not set, this indicates that DDI3 is being used in DP mode.

In one embodiment, bits 9-11 are labeled RSRV and are reserved and not otherwise used. Bits 9-11 may have a null value, a value of logic 0, or some other value.

In one embodiment, bit 12 is labeled DPLL0_used, bit 13 is labeled DPLL1_used, bit 14 is labeled DPLL2_used, and bit 15 is labeled DPLL3_used. In one embodiment, display engine 130 includes four PLLs that are used to clock signals sent from debug port controller 120. Bits 12-15 indicated which of those PLLs is currently being used.

Figure 5:
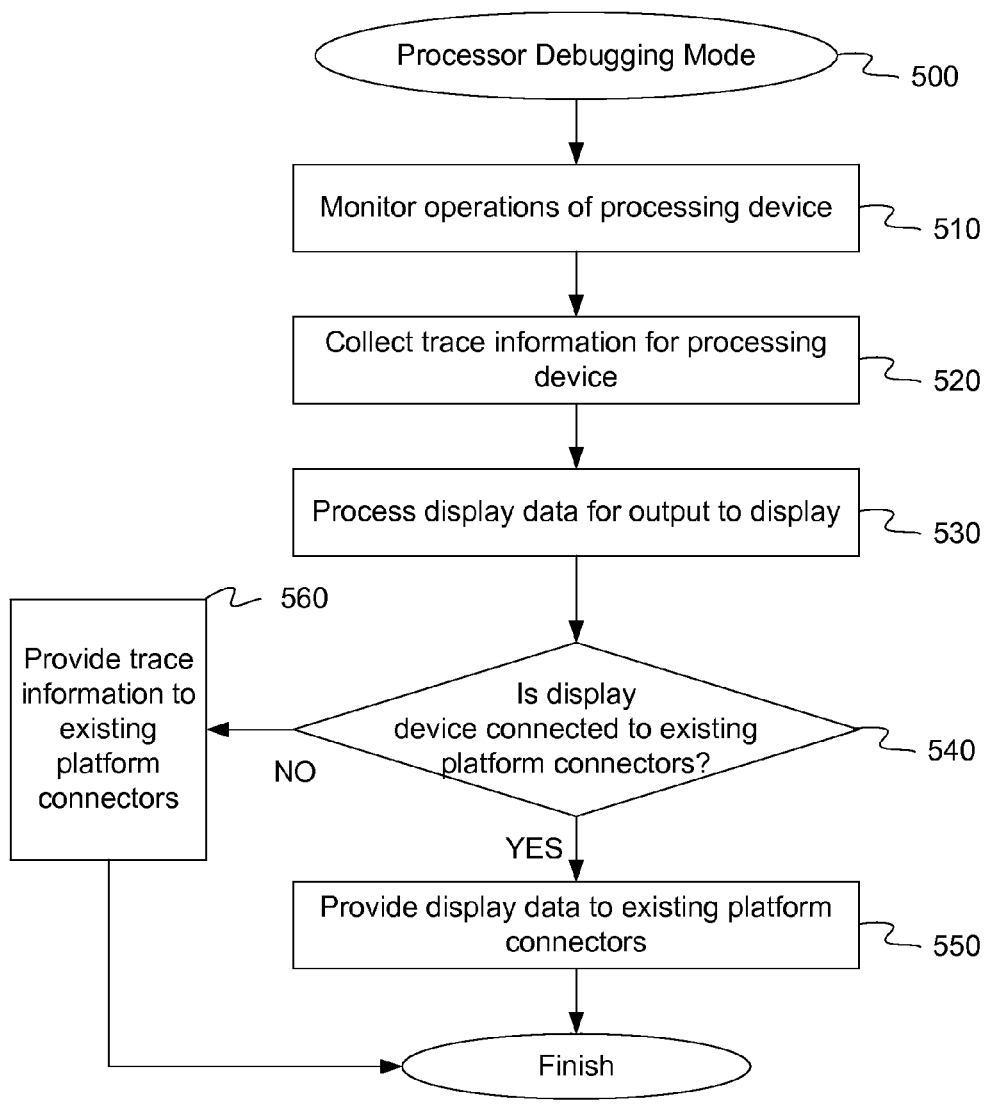
FIG. 5 is a flow diagram illustrating a method for processor debugging using standard high-speed port connectors, according to an embodiment.

FIG. 5 is a flow diagram illustrating a method for processor debugging using standard high-speed port connectors, according to an embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. The processing logic may output trace information over existing platform connectors allowing for high-speed debug operations in a closed-chassis (or open-chassis) system. In one embodiment, the method 500 is performed by debug port controller 120, as shown in FIGS. 1-3.

Referring to FIG. 5, at block 510, method 500 monitors the operations of processing device 110. In one embodiment, processor monitoring module 310 monitors the operations of processing device 110. Processor monitoring module 310 may observe and log actions performed by execution unit 112, display engine 130, display interface 140 and other components of processing device 110.

At block 520, method 500 collects trace information for the processing device 110. In one embodiment, trace information module 320 generates trace information that can be used during a debugging process. For example, debug information module 320 may collect, arrange, organize or summarize the data gathered by processor monitoring module 310. The trace information may be used to identify anomalies, discrepancies, defects or errors that occur in processing device 110.

At block 530, method 500 processes display data for output to a display. In one embodiment, display engine 130 may couple an image memory or other image source data to a display device such that video or image data is processed and properly formatted for the particular display device. Display engine 130 may convert image data that is retrieved from image memory into digital video or graphic display data that can ultimately be provided to a display device such as a television, CRT device, LCD display panel, LED display panel, mobile device display screen, consumer product display screen, OLED display, projection display, laser projection display or 3-D display device.

At block 540, method 500 determines if a display device is connected to the existing platform connectors. When a display device is connected, the processing device 110 is operating in a first, primary, mode of operation. In another embodiment, debug status register interface module 330 may access debug status register 352 to determine the mode of operation of processing device 110 (i.e., primary mode or debug mode). Based on the value stored in debug status register 352, debug status register interface module 330 may determine the operational mode and provide an indication of such mode to multiplexer control module 340.

If processing device 110 is operating in the first, primary, mode of operation, at block 550, method 500 provides display data to existing platform connectors 150. In one embodiment, multiplexer control module 340 generates a control signal CTRL to cause multiplexers 245, 246 and 247 to pass the display data from outputs DE2, DE3 and DE4 of display engine 130.

If processing device 110 is not operating in the first mode (i.e., processing device 110 is operating in a second, debug, mode), at block 560, method 500 provides trace information to existing platform connectors 150. In one embodiment, multiplexer control module 340 generates a control signal CTRL to cause multiplexers 245, 246 and 247 to pass the trace information from outputs L0-3 and L4-7 of debug port controller 120.

Figure 6:
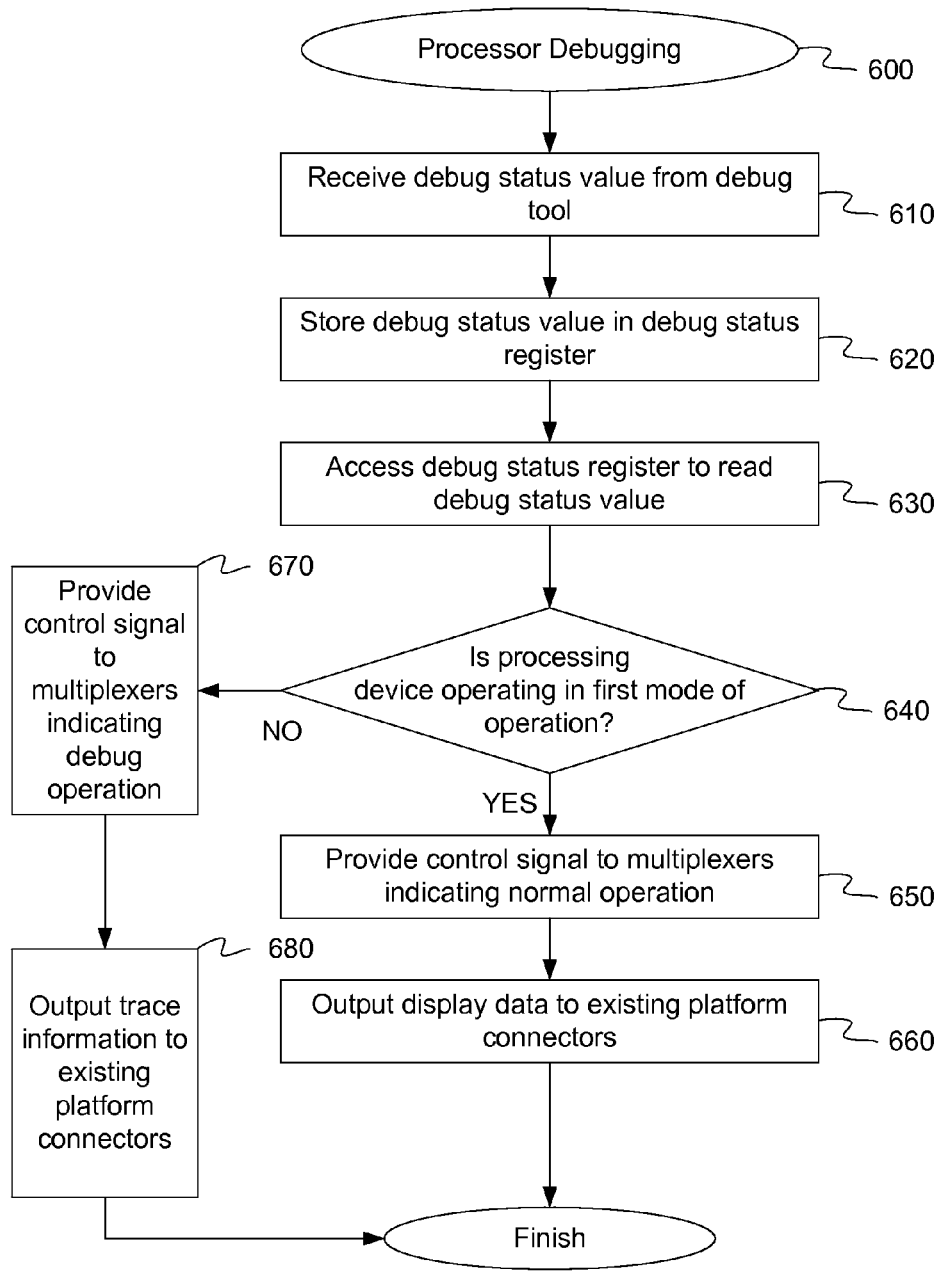
FIG. 6 is a flow diagram illustrating a method for processor debugging using standard high-speed port platform connectors, according to an embodiment.

FIG. 6 is a flow diagram illustrating a method for processor debugging using standard high-speed port connectors, according to an embodiment. The method 600 may be performed by processing logic that may comprise hardware (e.g., circuitry, dedicated logic, programmable logic, microcode, etc.), software (e.g., instructions run on a processing device to perform hardware simulation), or a combination thereof. The processing logic may output trace information over existing platform connectors allowing for high-speed debug operations in a closed-chassis system. In one embodiment, the method 600 is performed by debug port controller 120, as shown in FIGS. 1-3.

Referring to FIG. 6, at block 610, method 600 receives a debug status value. In one embodiment, debug status register interface module 330 may receive a debug status value to be stored in debug status register 352 from special debug tool 180 connected to computing platform 102 through communications port 170.

At block 620, method 600 stores the debug status value in debug status register 352. Upon receiving a debug status value, debug status register interface module 330 may write the debug status value into debug status register 352. In one embodiment, debug status register interface module 330 may overwrite the previously value in debug status register 352 with the newly received value.

At block 630, method 600 accesses debug status register 352 to read the debug status value. Either periodically or in response to a request for trace information, debug status register interface module 330 may access debug status register 352 to determine the mode of operation of processing device 110 (i.e., primary mode or debug mode).

At block 640, method 600 determines if the processing device 110 is operating in a first, primary, mode of operation. Based on the value stored in debug status register 352, debug status register interface module 330 may determine the operational mode and provide an indication of such mode to multiplexer control module 340.

If processing device 110 is operating in the first, primary, mode of operation, at block 650, method 600 provides a control signal CTRL indicating normal operation to multiplexers 245, 246, 247. In one embodiment, multiplexer control module 340 generates a control signal CTRL to cause multiplexers 245, 246 and 247 to pass the display data from outputs DE2, DE3 and DE4 of display engine 130. At block 660, method 600 outputs the display data to existing platform connectors 150.

If processing device 110 is not operating in the first mode (i.e., processing device 110 is operating in a second, debug, mode), at block 670, method 600 provides a control signal CTRL indicating debug operation to multiplexers 245, 246, 247. In one embodiment, multiplexer control module 340 generates a control signal CTRL to cause multiplexers 245, 246 and 247 to pass the trace information from outputs L0-3 and L4-7 of debug port controller 120. At block 680, method 600 outputs the trace information to existing platform connectors 150.

For closed chassis debug systems, the value of this solution may depend on HDMI/DP port availability. The solution is very flexible, as it allows multiple topologies with different bandwidths. In addition, sending debug traffic in real time over the OPI, to the PCH and USB, might be very intrusive to the system. In one embodiment, debug port controller 120 is inserted as a set of three intelligent multiplexers or other switches between display engine 130 and display interface 140. At normal operation, the default is to pass the display engine output. The intelligent multiplexers 245, 246, 247 can also be configured to select trace information from debug port controller 120. Since debug port controller 120 may be working during a reset sequence, debug port controller 120 may include all control and clock (PLL) setting, allowing it to work independently from display engine 130.

In one embodiment, the output of debug port controller 120 is converted to the Aurora protocol or another industry standard protocol for debug tools. This may allow easy adoption of the debug solution described herein by the industry dominant debug tools. The Aurora protocol is very similar to the DP protocol at the physical layer, and thus, can pass through the display interface multiplexers 245, 246, 247 and output through its PHY ports 242-244. DP/HDMI cables carry the trace information to the trace box 160. Thus, at the physical layer the solution uses the DP/HDMI electrical but on the link layer the solution uses the Aurora protocol. The solution described herein also applies also to other logical layers like PCIE STYLE.

Figure 7:
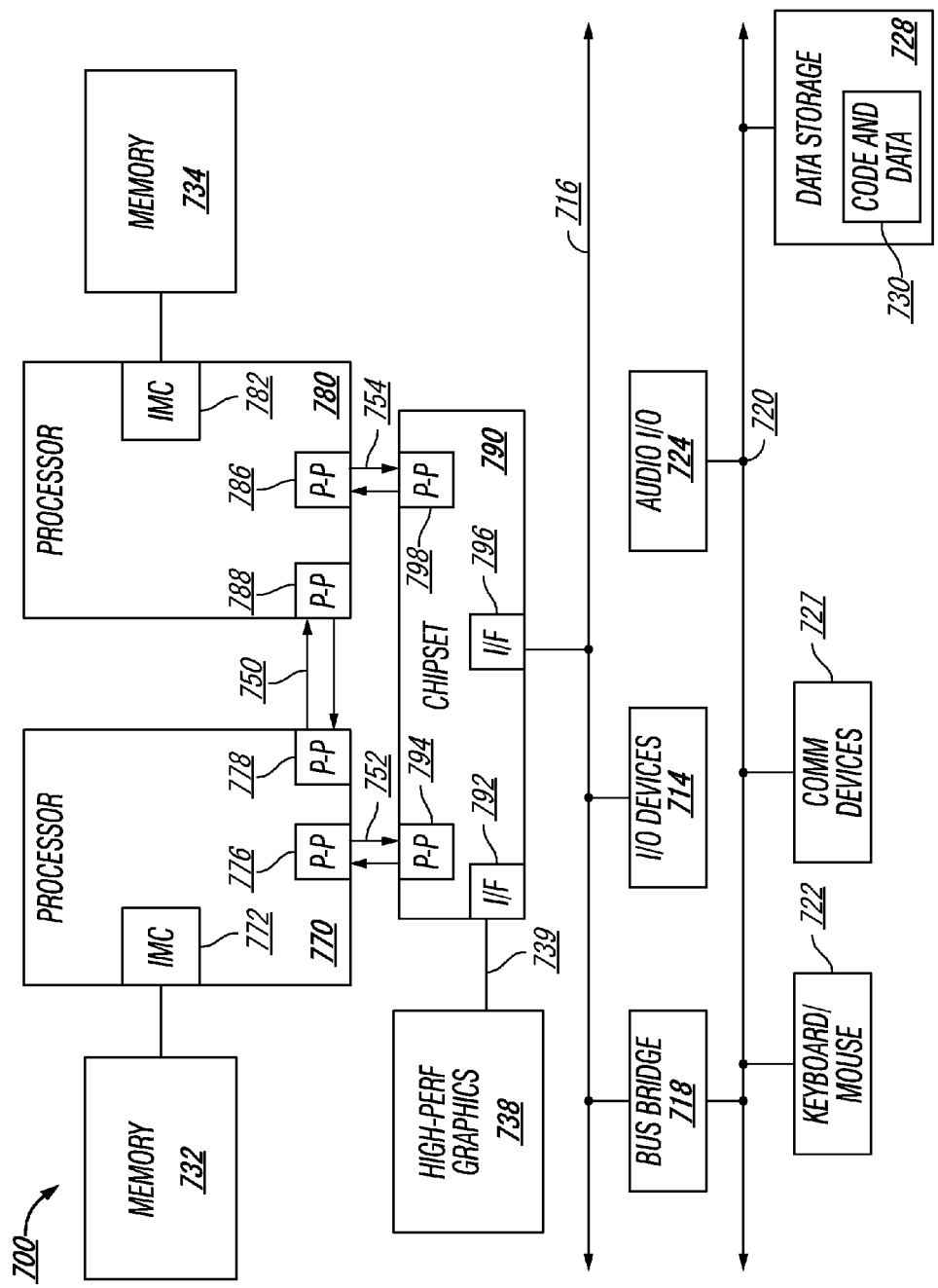
FIG. 7 is a block diagram of a computer system, according to an embodiment.

Referring now to FIG. 7, shown is a block diagram of a system 700 in accordance with an embodiment. As shown in FIG. 7, multiprocessor system 700 is a point-to-point interconnect system, and includes a first processor 770 and a second processor 780 coupled via a point-to-point interconnect 750. Each of processors 770 and 780 may be some version of the processing device 110, as shown in FIG. 1.

While shown with only two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770 and 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
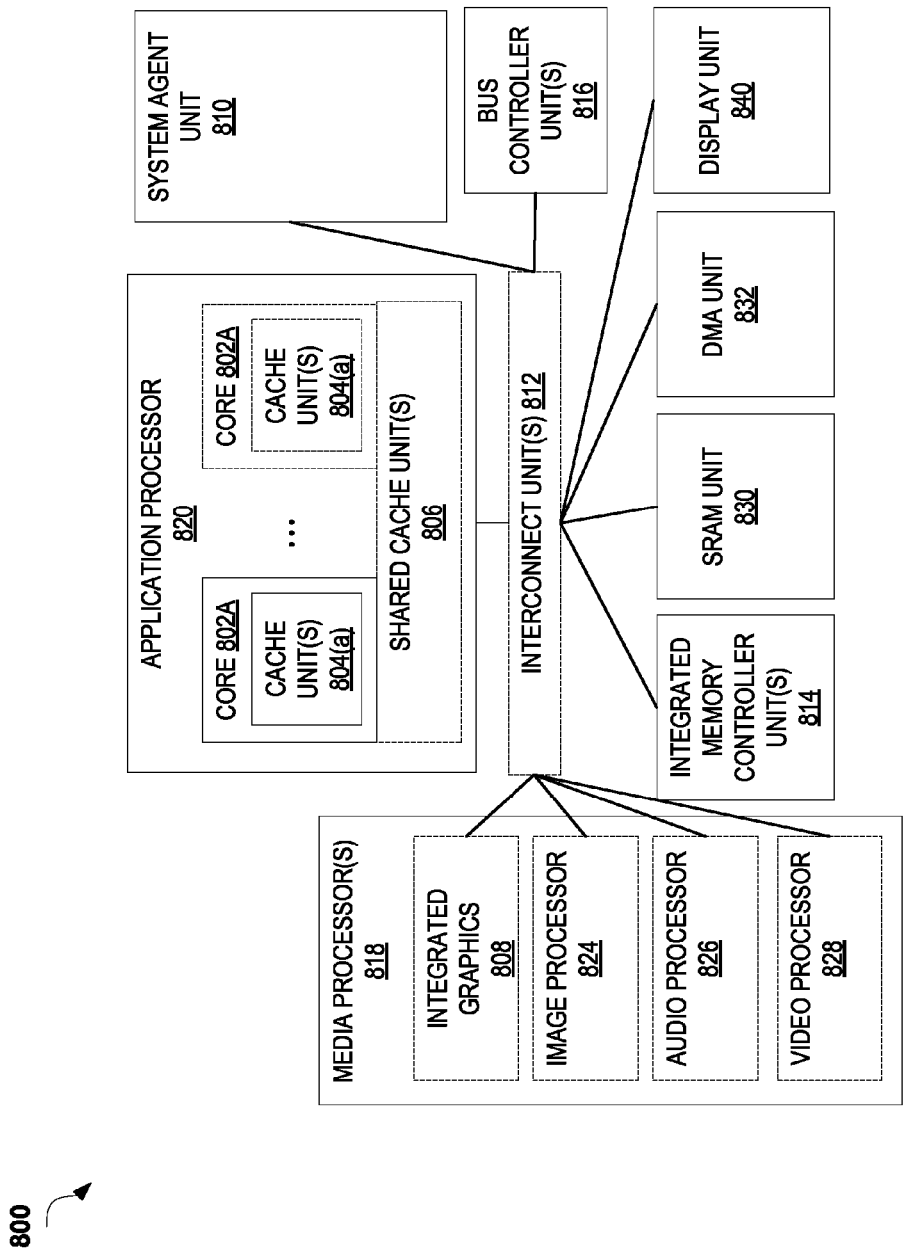
FIG. 8 is a block diagram of a system on chip (SoC) in accordance with an embodiment of the present disclosure.

Embodiments may be implemented in many different system types. FIG. 8 is a block diagram of a SoC 800 in accordance with an embodiment of the present disclosure. Dashed lined boxes are optional features on more advanced SoCs. In FIG. 8, an interconnect unit(s) 812 is coupled to: an application processor 820 which includes a set of one or more cores 802A-N and shared cache unit(s) 806; a system agent unit 810; a bus controller unit(s) 816; an integrated memory controller unit(s) 814; a set or one or more media processors 818 which may include integrated graphics logic 808, an image processor 824 for providing still and/or video camera functionality, an audio processor 826 for providing hardware audio acceleration, and a video processor 828 for providing video encode/decode acceleration; an static random access memory (SRAM) unit 830; a direct memory access (DMA) unit 832; and a display unit 840 for coupling to one or more external displays. In one embodiment, a memory module may be included in the integrated memory controller unit(s) 814. In another embodiment, the memory module may be included in one or more other components of the SoC 800 that may be used to access and/or control a memory. The application processor 820 may include a microcode context and aliased parameter passing logic as described in embodiments herein.

The memory hierarchy includes one or more levels of cache within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. In some embodiments, one or more of the cores 802A-N are capable of multi-threading.

The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture and/or instruction set. For example, some of the cores 802A-N may be in order while others are out-of-order. As another example, two or more of the cores 802A-N may be capable of execution the same instruction set, while others may be capable of executing only a subset of that instruction set or a different instruction set.

The application processor 820 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the application processor 820 may be from another company, such as ARM Holdings™, Ltd, MIPS™, etc. The application processor 820 may be a special-purpose processor, such as, for example, a network or communication processor, compression engine, graphics processor, co-processor, embedded processor, or the like. The application processor 820 may be implemented on one or more chips. The application processor 820 may be a part of and/or may be implemented on one or more substrates using any of a number of process technologies, such as, for example, BiCMOS, CMOS, or NMOS.

Figure 9:
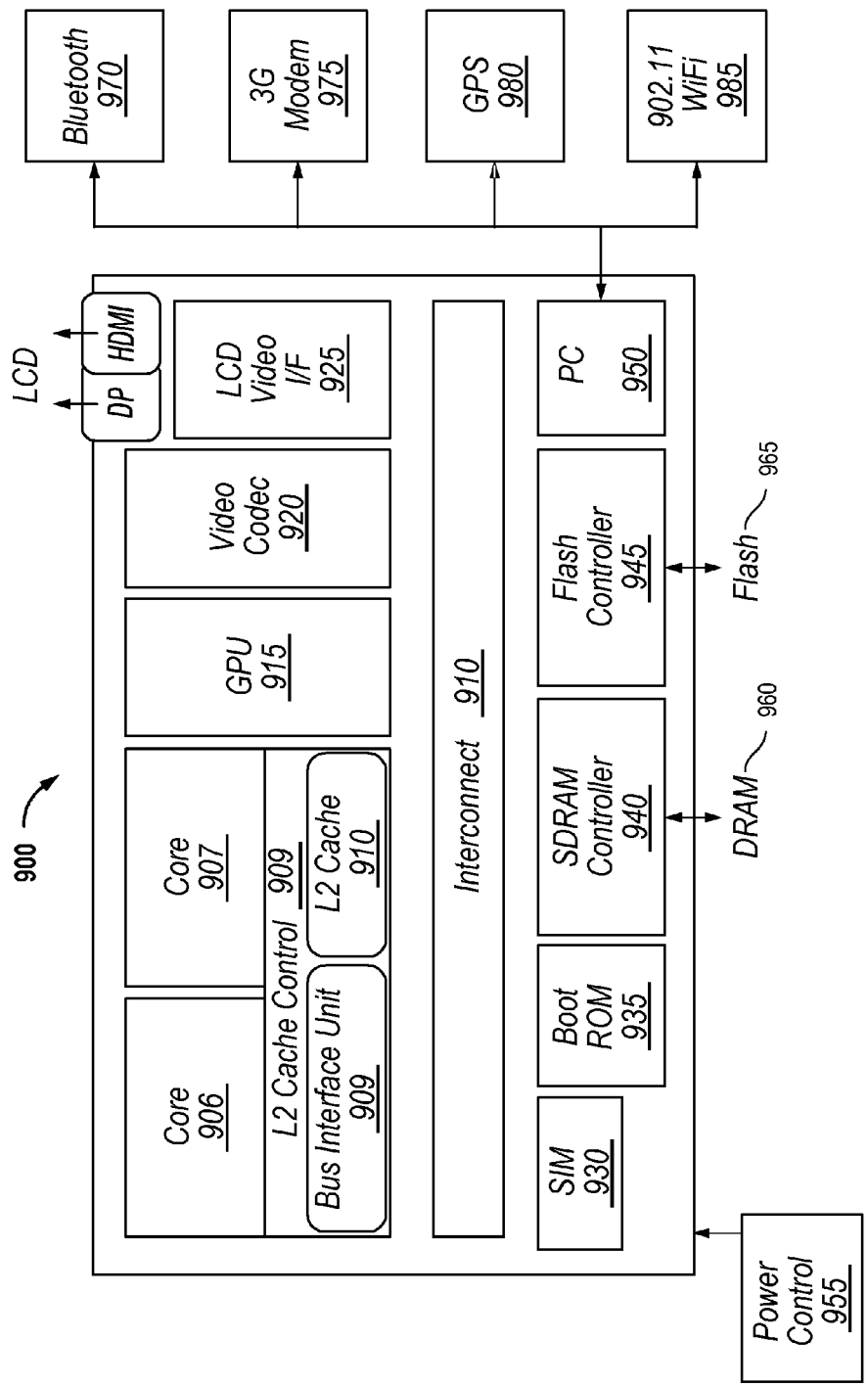
FIG. 9 is a block diagram of an embodiment of a system on-chip (SOC) design in accordance with an embodiment of the present disclosure.

FIG. 9 is a block diagram of an embodiment of a system on-chip (SoC) design in accordance with the present disclosure. As a specific illustrative example, SoC 900 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 900 includes two cores—906 and 907. Cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache control 908 that is associated with bus interface unit 909 and L2 cache 910 to communicate with other parts of system 900. Interconnect 910 includes an on-chip interconnect, such as an IOSF, AMBA, or other interconnect discussed above, which potentially implements one or more aspects of the described disclosure. In one embodiment, a microcode context and aliased parameter passing logic may be included in cores 906, 907.

Interconnect 910 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g. DRAM 960), a flash controller 945 to interface with non-volatile memory (e.g. Flash 965), a peripheral control 950 (e.g. Serial Peripheral Interface) to interface with peripherals, video codecs 920 and Video interface 925 to display (e.g., via HDMI or DP connectors) and receive input (e.g. touch enabled input), GPU 915 to perform graphics related computations, etc. Any of these interfaces may incorporate aspects of the disclosure described herein. In addition, the system 900 illustrates peripherals for communication, such as a Bluetooth module 970, 3G modem 975, GPS 980, and Wi-Fi 985.

Figure 10:
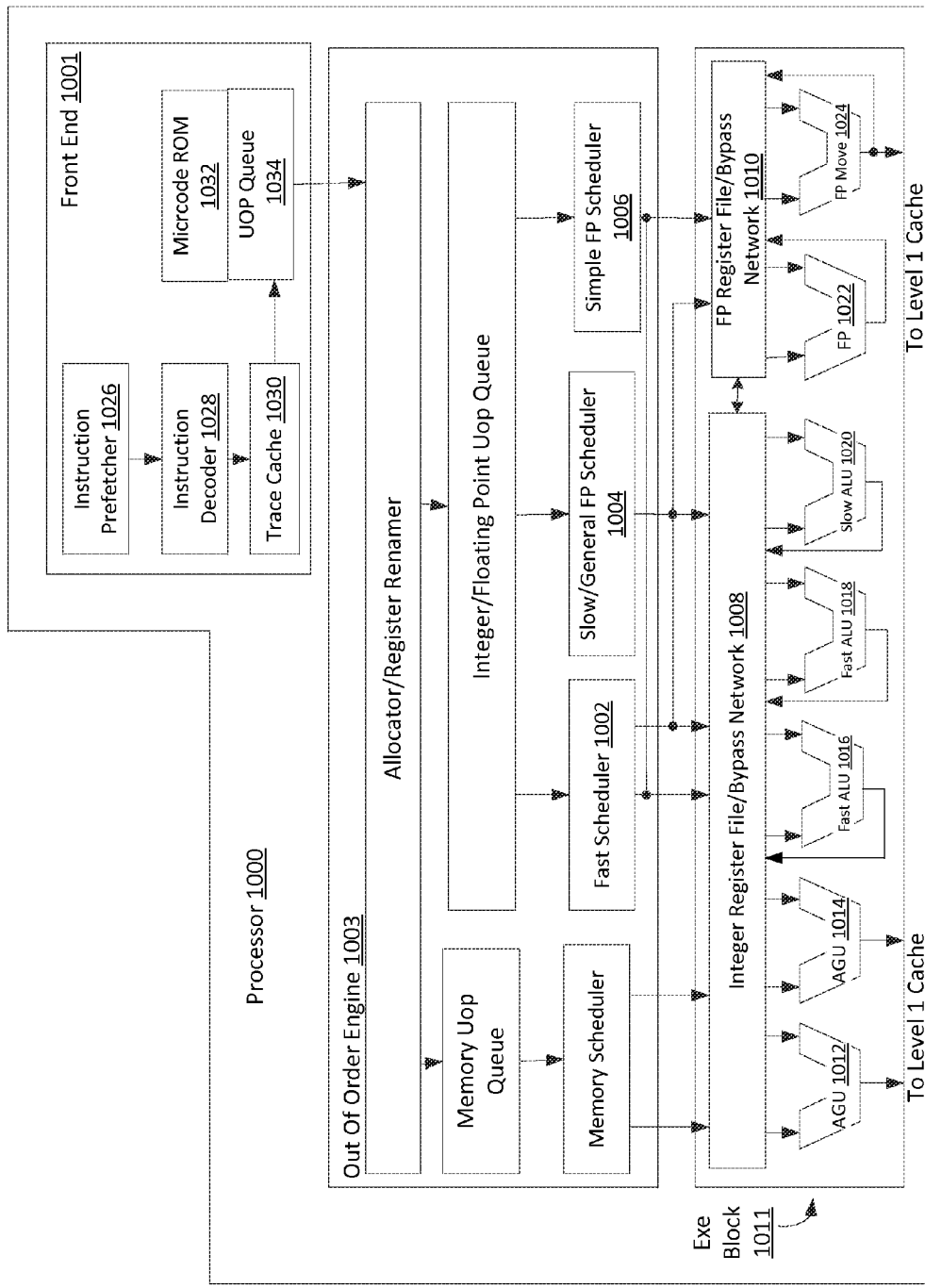
FIG. 10 illustrates a block diagram of the micro-architecture for a processor in accordance with one embodiment of the present disclosure.

FIG. 10 is a block diagram of the micro-architecture for a processor 1000 that includes logic circuits to perform instructions in accordance with one embodiment. The processor 1000 may be one example of the processing device 110, described above with respect to FIG. 1. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the in-order front end 1001 is the part of the processor 1000 that fetches instructions to be executed and prepares them to be used later in the processor pipeline. The front end 1001 may include several units. In one embodiment, the instruction prefetcher 1026 fetches instructions from memory and feeds them to an instruction decoder 1028 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1030 takes decoded uops and assembles them into program ordered sequences or traces in the uop queue 1034 for execution. When the trace cache 1030 encounters a complex instruction, the microcode ROM 1032 provides the uops needed to complete the operation.

Some instructions are converted into a single micro-op, whereas others need several micro-ops to complete the full operation. In one embodiment, if more than four micro-ops are needed to complete an instruction, the decoder 1028 accesses the microcode ROM 1032 to do the instruction. For one embodiment, an instruction can be decoded into a small number of micro ops for processing at the instruction decoder 1028. In another embodiment, an instruction can be stored within the microcode ROM 1032 should a number of micro-ops be needed to accomplish the operation. The trace cache 1030 refers to an entry point programmable logic array (PLA) to determine a correct micro-instruction pointer for reading the micro-code sequences to complete one or more instructions in accordance with one embodiment from the micro-code ROM 1032. After the microcode ROM 1032 finishes sequencing micro-ops for an instruction, the front end 1001 of the machine resumes fetching micro-ops from the trace cache 1030.

The out-of-order execution engine 1003 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1002, slow/general floating point scheduler 1004, and simple floating point scheduler 1006. The uop schedulers 1002, 1004, 1006, determine when a uop is ready to execute based on the readiness of their dependent input register operand sources and the availability of the execution resources the uops need to complete their operation. The fast scheduler 1002 of one embodiment can schedule on each half of the main clock cycle while the other schedulers can only schedule once per main processor clock cycle. The schedulers arbitrate for the dispatch ports to schedule uops for execution.

Register files 1008, 1010, sit between the schedulers 1002, 1004, 1006, and the execution units 1012, 1014, 1016, 1018, 1020, 1022, 1024 in the execution block 1011. There is a separate register file 1008, 1010, for integer and floating point operations, respectively. Each register file 1008, 1010, of one embodiment also includes a bypass network that can bypass or forward just completed results that have not yet been written into the register file to new dependent uops. The integer register file 1008 and the floating point register file 1010 are also capable of communicating data with the other. For one embodiment, the integer register file 1008 is split into two separate register files, one register file for the low order 32 bits of data and a second register file for the high order 32 bits of data. The floating point register file 1010 of one embodiment has 128 bit wide entries because floating point instructions typically have operands from 64 to 128 bits in width.

The execution block 1011 contains the execution units 1012, 1014, 1016, 1018, 1020, 1022, 1024, where the instructions are actually executed. This section includes the register files 1008, 1010, that store the integer and floating point data operand values that the micro-instructions need to execute. The processor 1000 of one embodiment is comprised of a number of execution units: address generation unit (AGU) 1012, AGU 1014, fast ALU 1016, fast ALU 1018, slow ALU 1020, floating point ALU 1022, floating point move unit 1024. For one embodiment, the floating point execution blocks 1022, 1024, execute floating point, MMX, SIMD, and SSE, or other operations. The floating point ALU 1022 of one embodiment includes a 64 bit by 64 bit floating point divider to execute divide, square root, and remainder micro-ops. For some embodiments, instructions involving a floating point value may be handled with the floating point hardware. In one embodiment, the ALU operations go to the high-speed ALU execution units 1016, 1018. The fast ALUs 1016, 1018, of one embodiment can execute fast operations with an effective latency of half a clock cycle. For one embodiment, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1012, 1014. For one embodiment, the integer ALUs 1016, 1018, 1020, are described in the context of performing integer operations on 64 bit data operands. In alternative embodiments, the ALUs 1016, 1018, 1020, can be implemented to support a variety of data bits including 16, 32, 128, 256, etc. Similarly, the floating point units 1022, 1024, can be implemented to support a range of operands having bits of various widths. For one embodiment, the floating point units 1022, 1024, can operate on 128 bits wide packed data operands in conjunction with SIMD and multimedia instructions.

In one embodiment, the uops schedulers 1002, 1004, 1006, dispatch dependent operations before the parent load has finished executing. As uops are speculatively scheduled and executed in processor 1000, the processor 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

The following examples pertain to further embodiments.

Example 1 is a processing device comprising 1) a debug port controller to monitor operations of the processing device to determine whether the processing device is operating in a first mode or a second mode and to collect trace information comprising operating characteristics of the processing device; 2) a display engine logic to process display data for output to a display device; and 3) a display engine interface, the display engine interface to provide, to a plurality of existing platform connectors, the display data from the display engine logic when the processing device is operating in the first mode as determined by the debug port controller and the trace information from the debug port controller when the processing device is operating in the second mode as determined by the debug port controller.

In Example 2, the processing device of Example 1 can optionally include the first mode comprising a primary operation mode.

In Example 3, the processing device of Example 1 can optionally include the second mode comprising a debug operation mode.

In Example 4, the processing device of Example 1 can optionally include the plurality of existing platform connectors comprising digital display interface connectors comprising at least one of a high-definition multimedia interface (HDMI) connector or a display port (DP) connector.

In Example 5, the processing device of Example 1, can optionally include the debug port controller accessing a debug status register storing a value to indicate one of the first mode or the second mode, wherein the value stored in the debug status register is received from a special debug tool coupled to the debug port controller through a platform communication port.

In Example 6, the processing device of Example 1, can optionally include the display interface comprising a multiplexer associated with each of the plurality of existing platform connectors, each multiplexer to receive at least a portion of the display data from the display engine logic and at least a portion of the trace information from the debug port controller as inputs and to select one of the inputs to output to the existing platform connector in response to a control signal received from the debug port controller.

In Example 7, the processing device of Example 1, can optionally include the trace information comprising at least one of power consumption data, protection ring data, memory access data, or processing device interconnect data.

Example 8 is a method comprising: 1) monitoring, by a debug port controller, operations of a processing device to determine whether the processing device is operating in a first mode or a second mode; 2) collecting, by the debug port controller, trace information comprising operating characteristics of the processing device; 3) processing, by a display engine logic, display data for output to a display device; 4) providing, by a display engine interface to a plurality of existing platform connectors, the display data from the display engine logic when the processing device is operating in the first mode as determined by the debug port controller; and 5) providing, by the display engine interface to the plurality of existing platform connectors, the trace information from the debug port controller when the processing device is operating in the second mode as determined by the debug port controller.

In Example 9, the method of Example 8 can optionally include the first mode comprising a primary operation mode.

In Example 10, the method of Example 8 can optionally include the second mode comprising a debug operation mode.

In Example 11, the method of Example 8 can optionally include the plurality of existing platform connectors comprising digital display interface connectors comprising at least one of a high-definition multimedia interface (HDMI) connector or a display port (DP) connector.

In Example 12, the method of Example 8 can optionally include accessing a debug status register storing a value to indicate one of the first mode or the second mode, wherein the value stored in the debug status register is received from a special debug tool coupled to the debug port controller through a platform communication port.

In Example 13, the method of Example 8, can optionally include receiving, at a multiplexer associated with each of the plurality of existing platform connectors, at least a portion of the display data from the display engine logic and at least a portion of the trace information from the debug port controller as inputs and selecting one of the inputs to output to the existing platform connector in response to a control signal received from the debug port controller.

In Example 14, the method of Example 8, can optionally include the trace information comprising at least one of power consumption data, protection ring data, memory access data, or processing device interconnect data.

Example 15 is a system comprising: 1) a computing platform comprising a plurality of existing platform connectors and a processing device, the processing device comprising: a) a debug port controller to monitor operations of the processing device to determine whether the processing device is operating in a first mode or a second mode and to collect trace information comprising operating characteristics of the processing device; b) a display engine logic to process display data for output to a display device; and c) a display engine interface, the display engine interface to provide, to the plurality of existing platform connectors, the display data from the display engine logic when the processing device is operating in the first mode as determined by the debug port controller and the trace information from the debug port controller when the processing device is operating in the second mode as determined by the debug port controller; and 2) a trace box, coupled to the computing platform through the plurality of existing platform connectors, to receive and store the trace information from the debug port controller.

In Example 16, the system of Example 15 can optionally include the first mode comprising a primary operation mode, and the second mode comprising a debug operation mode.

In Example 17, the system of Example 15, can optionally include the plurality of existing platform connectors comprises digital display interface connectors comprising at least one of a high-definition multimedia interface (HDMI) connector or a display port (DP) connector.

In Example 18, the system of Example 15, can optionally include a special debug tool coupled to the computing platform through a platform communication port, wherein to determine whether the processing device is operating in the first mode or the second mode, the debug port controller to access a debug status register storing a value to indicate one of the first mode or the second mode, and wherein the value stored in the debug status register is received from the special debug tool.

In Example 19, the system of Example 15, can optionally include the display interface comprising a multiplexer associated with each of the plurality of existing platform connectors, each multiplexer to receive at least a portion of the display data from the display engine logic and at least a portion of the trace information from the debug port controller as inputs and to select one of the inputs to output to the existing platform connector in response to a control signal received from the debug port controller.

In Example 20, the system of Example 15, can optionally include the trace information comprising at least one of power consumption data, protection ring data, memory access data, or processing device interconnect data.

Example 21 is an apparatus comprising: 1) means for monitoring, by a debug port controller, operations of a processing device to determine whether the processing device is operating in a first mode or a second mode; 2) means for collecting, by the debug port controller, trace information comprising operating characteristics of the processing device; 3) means for processing, by a display engine logic, display data for output to a display device; 4) means for providing, by a display engine interface to a plurality of existing platform connectors, the display data from the display engine logic when the processing device is operating in the first mode as determined by the debug port controller; and 5) means for providing, by the display engine interface to the plurality of existing platform connectors, the trace information from the debug port controller when the processing device is operating in the second mode as determined by the debug port controller.

In Example 22, the apparatus of Example 21 can optionally include the first mode comprising a primary operation mode.

In Example 23, the apparatus of Example 21 can optionally include the second mode comprising a debug operation mode.

In Example 24, the apparatus of Example 21 can optionally include the plurality of existing platform connectors comprising digital display interface connectors comprising at least one of a high-definition multimedia interface (HDMI) connector or a display port (DP) connector.

In Example 25, the apparatus of Example 21 can optionally include means for accessing a debug status register storing a value to indicate one of the first mode or the second mode, wherein the value stored in the debug status register is received from a special debug tool coupled to the debug port controller through a platform communication port.

In Example 26, the apparatus of Example 21, can optionally include means for receiving, at a multiplexer associated with each of the plurality of existing platform connectors, at least a portion of the display data from the display engine logic and at least a portion of the trace information from the debug port controller as inputs and selecting one of the inputs to output to the existing platform connector in response to a control signal received from the debug port controller.

In Example 27, the apparatus of Example 21, can optionally include the trace information comprising at least one of power consumption data, protection ring data, memory access data, or processing device interconnect data.

Example 28 is an apparatus comprising: 1) a memory; and 2) a computing system coupled to the memory, wherein the computing system is configured to perform the method of at least one of the claims 8-14.

In Example 29, the apparatus of Example 28, can optionally include the computing system comprising a processing device.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular embodiments may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A processing device comprising:
a debug port controller to monitor operations of the processing device to determine whether the processing device is operating in a first mode or a second mode by accessing a debug status register storing a value to indicate one of the first mode or the second mode, wherein the value is received from an external tool coupled to a platform communication port, and the debug port controller further to collect trace information comprising operating characteristics of the processing device;
a display engine logic to process display data for output to a display device; and
a display engine interface, the display engine interface to provide, to a plurality of existing platform connectors not including the platform communication port, the display data from the display engine logic when the processing device is operating in the first mode as determined by the debug port controller and to provide, to the plurality of existing platform connectors not including the platform communication port, the trace information from the debug port controller when the processing device is operating in the second mode as determined by the debug port controller.

2. The processing device of claim 1, wherein the first mode comprises a primary operation mode.

3. The processing device of claim 1, wherein the second mode comprises a debug operation mode.

4. The processing device of claim 1, wherein the plurality of existing platform connectors comprises digital display interface connectors comprising at least one of a high-definition multimedia interface (HDMI) connector or a display port (DP) connector.

5. The processing device of claim 1, wherein the value stored in the debug status register is received from a debug tool coupled to the debug port controller through a platform communication port.

6. The processing device of claim 1, wherein the display interface comprises a multiplexer associated with each of the plurality of existing platform connectors, each multiplexer to receive at least a portion of the display data from the display engine logic and at least a portion of the trace information from the debug port controller as inputs and to select one of the inputs to output to the existing platform connector in response to a control signal received from the debug port controller.

7. The processing device of claim 1, wherein the trace information comprises at least one of power consumption data, protection ring data, memory access data, or processing device interconnect data.

8. A method comprising:
monitoring, by a debug port controller, operations of a processing device to determine whether the processing device is operating in a first mode or a second mode by accessing a debug status register storing a value to indicate one of the first mode or the second mode, wherein the value is received from an external tool coupled to a platform communication port;
collecting, by the debug port controller, trace information comprising operating characteristics of the processing device;
processing, by a display engine logic, display data for output to a display device;
providing, by a display engine interface to a plurality of existing platform connectors, the display data from the display engine logic when the processing device is operating in the first mode as determined by the debug port controller; and
providing, by the display engine interface to the plurality of existing platform connectors not including the platform communication port, the trace information from the debug port controller when the processing device is operating in the second mode as determined by the debug port controller.

9. The method of claim 8, wherein the first mode comprises a primary operation mode.

10. The method of claim 8, wherein the second mode comprises a debug operation mode.

11. The method of claim 8, wherein the plurality of existing platform connectors comprises digital display interface connectors comprising at least one of a high-definition multimedia interface (HDMI) connector or a display port (DP) connector.

12. The method of claim 8, wherein the value stored in the debug status register is received from a debug tool coupled to the debug port controller through a platform communication port.

13. The method of claim 8, further comprising:
receiving, at a multiplexer associated with each of the plurality of existing platform connectors, at least a portion of the display data from the display engine logic and at least a portion of the trace information from the debug port controller as inputs; and
selecting one of the inputs to output to the existing platform connector in response to a control signal received from the debug port controller.

14. The method of claim 8, wherein the trace information comprises at least one of power consumption data, protection ring data, memory access data, or processing device interconnect data.

15. A system comprising:
a computing platform comprising a plurality of existing platform connectors and a processing device, the processing device comprising:

a debug port controller to monitor operations of the processing device to determine whether the processing device is operating in a first mode or a second mode by accessing a debug status register storing a value to indicate one of the first mode or the second mode, wherein the value is received from an external tool coupled to a platform communication port, and to collect trace information comprising operating characteristics of the processing device;

a display engine logic to process display data for output to a display device; and a display engine interface, the display engine interface to provide, to the plurality of existing platform connectors not including the platform communication port, the display data from the display engine logic when the processing device is operating in the first mode as determined by the debug port controller and the trace information from the debug port controller when the processing device is operating in the second mode as determined by the debug port controller; and a trace box, coupled to the computing platform through the plurality of existing platform connectors, to receive and store the trace information from the debug port controller.

16. The system of claim 15, wherein the first mode comprises a primary operation mode, and wherein the second mode comprises a debug operation mode.

17. The system of claim 15, wherein the plurality of existing platform connectors comprises digital display interface connectors comprising at least one of a high-definition multimedia interface (HDMI) connector or a display port (DP) connector.

18. The system of claim 15, further comprising:
a debug tool coupled to the computing platform through a platform communication port, wherein the value stored in the debug status register is received from the debug tool.

19. The system of claim 15, wherein the display interface comprises a multiplexer associated with each of the plurality of existing platform connectors, each multiplexer to receive at least a portion of the display data from the display engine logic and at least a portion of the trace information from the debug port controller as inputs and to select one of the inputs to output to the existing platform connector in response to a control signal received from the debug port controller.

20. The system of claim 15, wherein the trace information comprises at least one of power consumption data, protection ring data, memory access data, or processing device interconnect data.

* * * * *